(12) United States Patent  
Erhart et al.

(10) Patent No.: US 8,331,550 B2
(45) Date of Patent: Dec. 11, 2012

(54) SOCIAL MEDIA LANGUAGE IDENTIFICATION AND ROUTING

(75) Inventors: George Erhart, Loveland, CO (US);
David Skiba, Golden, CO (US);
Valentine C. Matula, Granville, OH (US)

(73) Assignee: Avaya Inc., Basking Ridge, NJ (US)

( * ) Notice: Subject to any disclaimer, the term of this patent is extended or adjusted under 35 U.S.C. 154(b) by 388 days.

(21) Appl. No.: 12/709,135

(22) Filed: Feb. 19, 2010

(65) Prior Publication Data
US 2011/0123015 A1 May 26, 2011

Related U.S. Application Data

(60) Provisional application No. 61/263,013, filed on Nov. 20, 2009.

(51) Int. Cl.
*H04M 3/00* (2006.01)
(52) U.S. Cl. .................................. 379/265.12
(58) Field of Classification Search ............. 379/265.12, 379/265.09
See application file for complete search history.

(56) References Cited

U.S. PATENT DOCUMENTS

| 6,205,215 B1* | 3/2001 | Dombakly .................... 379/223 |
| 6,847,714 B2 | 1/2005 | Das et al. |
| 2009/0198487 A1* | 8/2009 | Wong et al. ....................... 704/4 |

* cited by examiner

*Primary Examiner* — Creighton Smith

(57) ABSTRACT

A communication from a person in a first language is received at a contact center. A social network that the person frequents is searched to determine if the person can converse in a second language. The determination that the person can converse in the second language can be done through text analysis, voice analysis, picture analysis, video analysis, or different combinations of these. Based on the person being able to converse in the second language, the communication is routed differently within the contact center.

In a second embodiment, the system and method searches the first social network to determine an issue in a first language. A second social network is searched to determine if the person can converse in a second language. Based on the person being able to converse in the second language, the issue is responded to based on the second language.

36 Claims, 6 Drawing Sheets

SOCIAL MEDIA LANGUAGE IDENTIFICATION AND ROUTING

RELATED U.S. PATENT APPLICATION DATA

This application claims the benefit under 35 U.S.C. §119(e) of U.S. Provisional Patent Application No. 61/263,013, filed Nov. 20, 2009, entitled "GEO POD SYSTEM."

TECHNICAL FIELD

The system and method relate to language identification, and in particular to identifying a second language based on social networks.

BACKGROUND

Some of the current contact center solutions have attempted to identify issues that arise on social networks. For example, a person may identify an issue that is associated with a product or service using a second language that is not native to the person on a social network such as a blog. An agent in the contact center may try to respond to the issue by communicating with the person who identified the issue. This works fine when the agent who responds to the issue and the person who identified the issue can both correspond/speak fluently. However, sometimes this is not the case. For example, the person who identified the issue may be able to write in the second language fairly well, but may not be able to speak the second language fluently. If the contact center agent calls the person who identified the issue and tries to communicate vocally, the agent may have difficulty understanding the person who identified the issue because of this lack of fluency.

Another example can be that even though the person who identified the issue can communicate in the second language (or multiple additional languages), they may prefer to converse in their native language. Being able to identify that the person can speak in two or more languages would allow the contact center to identify a different agent that can communicate in the native language (and optionally in both the native language and the second language(s)), thus increasing the customer's satisfaction.

Similar problems exist when a person sends emails, Instant Messaging (IM), or other written communications to a contact center using a second language that is not their native language. Since the communication is in the second language, the communication is then routed to an agent that can communicate using the second language. This can cause similar problems because of the person's and the agent's inability to correspond/speak in the second language.

Likewise, when a caller calls into the contact center using a second language, the call is directed to an agent to handle the caller's problem. In many cases, the caller may have difficulty conversing with an agent of the contact center in the second language due to heavy accents and/or lack of fluency in the language. What is needed is a way to proactively identify different languages spoken by the person in order to provide better customer service.

SUMMARY

The system and method are directed to solving these and other problems and disadvantages of the prior art. A communication from a person in a first language is received at a contact center. A social network that the person frequents is searched to determine if the person can converse in a second language. The determination that the person can converse in the second language can be done through text analysis, voice analysis, picture analysis, video analysis, or different combinations of these. Based on the person being able to converse in the second language, the communication is routed differently within the contact center.

In a second embodiment, the system and method searches the first social network to determine an issue in a first language. A second social network is searched to determine if the person can converse in a second language. Based on the person being able to converse in the second language, the issue is responded to based on the second language.

BRIEF DESCRIPTION OF THE DRAWINGS

These and other features and advantages of the system and method will become more apparent from considering the following description of an illustrative embodiment of the system and method together with the drawing, in which.

DETAILED DESCRIPTION

Figure 1:
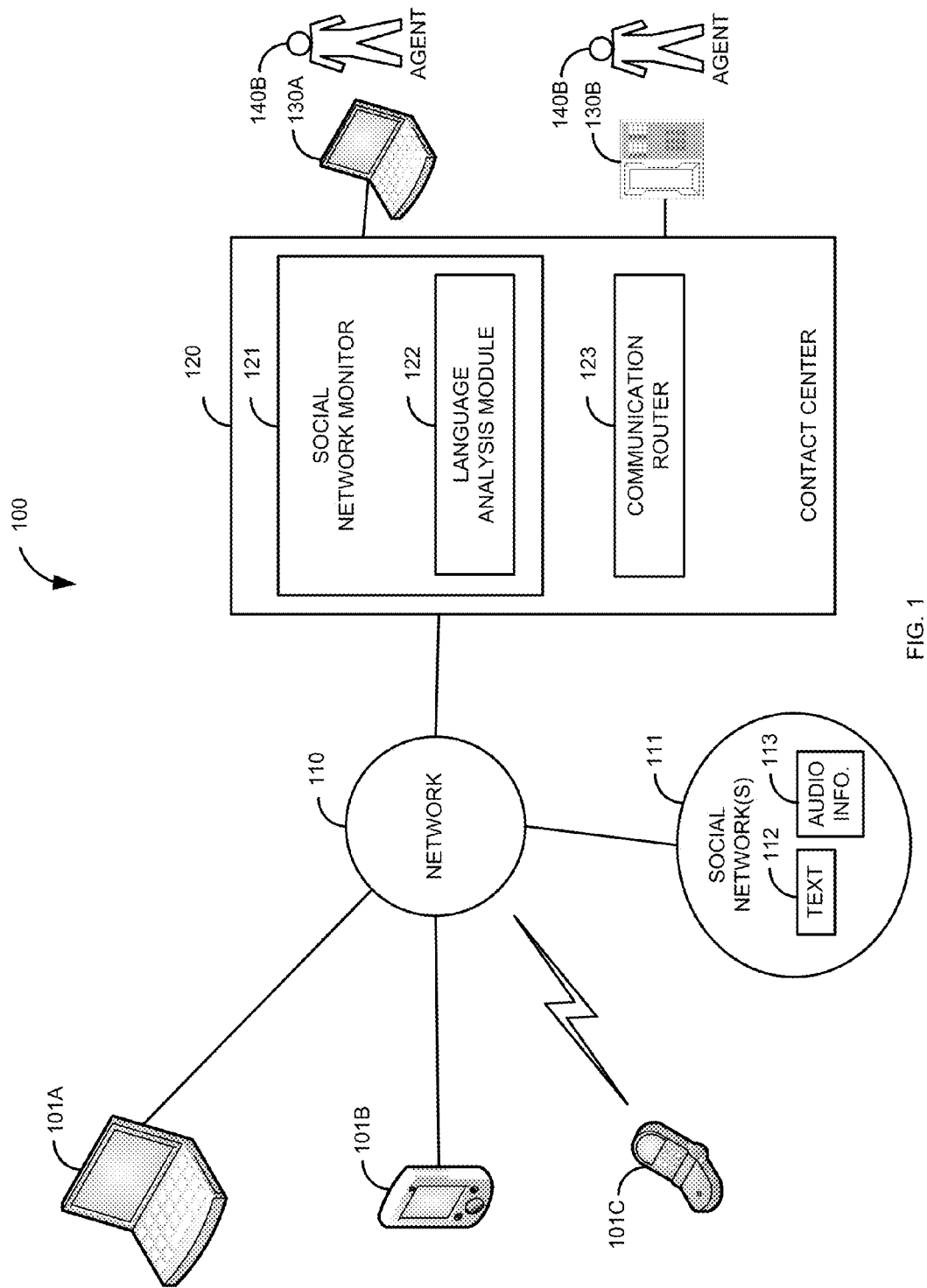
FIG. 1 is a block diagram of a first illustrative system for determining communication languages of a person.

FIG. 1 is a block diagram of a first illustrative system 100 for determining communication languages of a person. The first illustrative system 100 comprises communication devices 101, a network 110, a social network 111, a contact center 120, agent terminals 130, and agents 140. The communication devices 101 can be any type of device that can communicate on the network 110 such as a Personal Computer (PC), a laptop computer, a Personal Digital Assistant (PDA), a telephone, a cellular telephone, a server, a Private Branch Exchange (PBX), and the like. Illustratively, communication device 101A is shown as a laptop computer, communication device 101B is shown as a PDA, and communication device 101C is shown as a cellular telephone.

The network 110 can be any type of network using any type of protocol such as the Internet, a Local Area Network (LAN), a Wide Area Network (WAN), the Public Switched Telephone Network (PSTN), a wireless network, a cellular network, a wired network, and the like. The social network 111 can be any type of network where people converse, such as a blog site, a web site, Facebook, Twitter, a Real Simple Syndication (RSS) feed, a voice conference call, and the like. The social network 111 is shown separate from network 110 for illustrative purposes; however, the social network 111 can be part of network 110. The social network 111 further comprises text 112 and/or audio information 113. The text 112 can be, for example, text written by a person on a blog site, the text on the person's Facebook page, text on the person's web site, text of an RSS feed the person subscribes to, and the like. The audio information 113 can be speech in an RSS feed, speech of a conference call, speech of a telephone call, an audio file, a music file, and the like. The audio information 113 can be, for example, files/information placed on a person's Facebook page such as music files, audio files, an audio portion of a video, and the like.

The contact center 120 comprises a social network monitor 121 and a communication router 123. The contact center 120 can be any contact center 120 that can handle communications from a person and/or agents 140. For example, the contact center 120 can handle voice communications, text communications, video communications, various combinations of these, and the like.

The social network monitor 121 is any system that can search one or more social networks 111 such as a server, a Private Branch eXchange (PBX), and the like. The social network monitor 121 can search the social network(s) 111 in various ways. For example, the social network monitor 121 can search the social networks 111 by actively searching the social networks 111, by passively searching the social networks 111, by searching the social networks 111 periodically, based on detection of an event in the social network 111, based on a time period, based on a new post of a person, based on previous posts of a person (e.g., historical posts of a person), and the like. The social network monitor 121 is shown illustratively as part of the contact center 120; however, the social network monitor 121 may be separate from the contact center 120. The social network monitor 121 further comprises a language analysis module 122. The language analysis module 122 can be any device/software that can determine a language from information on a social network 111 such as the text 112 and/or audio information 113 on the social network 111. The language analysis module 122 can determine a language by identifying text characters that are on the social network and comparing those characters to characters of known languages. The language analysis module 122 can identify a language based on a language identifier (a language identifier of a web site), the text of a browser cookie, a language plug-in, a telephone number (i.e., the area code or country code may help identify the language), an installed language (i.e., the installed languages in an operating system), a web browser history (i.e., the languages of web sites visited by the person), and the like.

The language analysis module 122 can determine a language by taking an audio signal (audio information 113) and determining the language of the audio signal using known voice recognition techniques. For example, using this technique, the language analysis module 122 can determine a language of an audio file, a language of a music file, a language of the audio portion of a video, a language of an audio conversation, and the like.

The communication router 123 can be any device capable of routing communications between a person and an agent 140 such as a PBX, a mail server, a router, an Instant Messaging (IM) server, a video server, an Interactive Voice Response (IVR) system, and the like. The communication router 123 is illustratively shown as part of the contact center 120; however, the communication router 123 can be separate from the contact center 120.

The agent terminals 130 can be any type of device that allows the agents 140 to communicate with a person such as a personal computer, a terminal, a telephone, and the like. The agents 140 are shown figuratively as people, but could also be an automated system.

The social network monitor 121 searches the social network 111 to determine if a person can converse in a second language. The social network monitor 121 can search the social network 111 by getting text 112 from the social network 111 and determining that the person is conversing in the second language (e.g., blogging in the second language). The communication router 123 receives a communication from the person in a first language. The communication router 123 routes the communication differently in response to the determination that the person can converse in the second language.

For example, assume that a person (Joe) logs on to his Facebook page 111 from his laptop computer 101A. Joe communicates with his friends and/or family on his Facebook page from his laptop computer 101A by posting text 112 in Spanish. The social network monitor 121 has identified that Facebook is one of Joe's social networks 111 and searches Joe's Facebook page. This could be done based on previous interactions with Joe, by searching Facebook to determine user's names, and the like. The social network monitor 121 via the language analysis module 122 determines that Joe can converse in Spanish by analyzing the text 112 on Joe's Facebook page.

Joe then calls the contact center 120 from his cell phone 101C to discuss a problem Joe is having with his laptop computer 101A. The contact center 120 determines that it is Joe calling based on Joe's telephone number. Joe requests to speak with an agent 140 in English (i.e., by speaking to an Interactive Voice Response system in English, and/or based on the area code of Joe's number or some other process). After receiving the call from Joe, the communication router 123 in the contact center 120 routes the call to agent 140B instead of agent 140A. This is because agent 140A only speaks English while agent 140B is fluent in both English and Spanish. The call is routed by the communication router 123 to telephone 130B, where agent 140B is alerted that Joe's native language is likely Spanish because he converses with his friends and family in Spanish on his Facebook page. Agent 140B can use this information and ask Joe if he would like to discuss his problem in Spanish or English.

Figure 2:
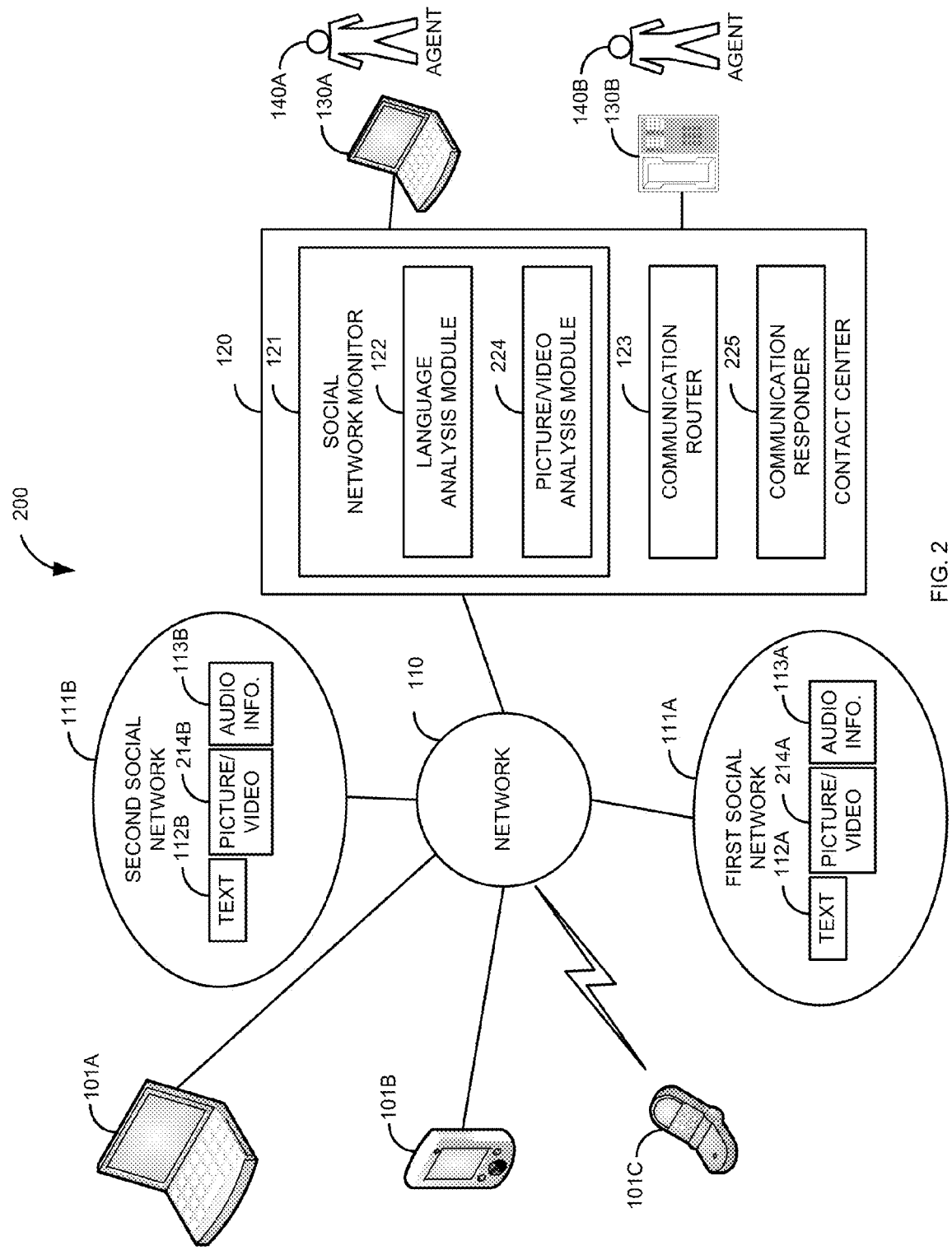
FIG. 2 is a block diagram of a second illustrative system for determining communication languages of a person.

FIG. 2 is a block diagram of a second illustrative system 200 for determining communication languages of a person. The second illustrative system 200 builds upon the first illustrative system 100. In the second illustrative system 200, two social networks 111A & 111B are shown. Social networks 111A and 111B are shown separately, but could be different sections within a single social network 111 or the same social network 111. In addition, the social networks 111A-111B also comprises picture/video 214 (shown as pictures/video 214A-214B in social networks 111A-111B), text 112A-112B, and audio information 113A-113B. Pictures/video 214A-214B can be any type of picture, video, or image, such as a picture of a person, place, and the like. Pictures/video 214A-214B can include text 112 or Global Positioning Satellite (GPS) coordinates of where the picture/video 214 was taken. For example, the person may have posted a picture 214 of themselves in front of their apartment building on the web page of their social network 111 that has GPS coordinates of where the picture 214 was taken. Pictures/video 214A-214B can be a video file, a video stream, and/or a live video stream.

The social network monitor 121 further comprises a picture/video analysis module 224. The picture/video analysis module 224 can be any device/software that is capable of identifying a location of where a picture/video 214 was taken such as a server, a software application, and the like. The picture/video analysis module 224 is shown as part of the social network monitor 121, but could exist separate from the social network monitor 121. The contact center 120 further comprises a communication responder 225. The communication responder 225 can be any device/software that is capable of responding to an issue of a person that is in communication with the contact center 120.

The social network monitor 121 identifies an issue of a person in a first language on the first social network 111A. The social network monitor 121 can identify an issue in various ways. For example, the social network monitor 121 can identify the issue by identifying key words or phrases posted by the person on a blog site (social network 111A). The social network monitor 121 can identify the issue by determining an increase in the number of conversations about an issue by the person on their social network 111A or using other methods known in the art.

The social network monitor 121 searches the second social network 111B to determine if the person can converse in a second language. The determination is done by the language analysis module 122. The determination can be done by analyzing text 112B, and/or audio information 113B as discussed previously.

In addition, the picture/video analysis module 224 can identify the location of picture/video 214B based on recognition of different objects in picture/video 214B. For example, the picture/video analysis module 224 can determine that picture/video 214B was taken in Paris based on recognition of the Eiffel Tower in the background. Knowing that the person has been to Paris can be used to determine if the person's second language is French. This can also be done from a video file by looking at frames of the video file. Identifying objects in the video frames that were taken in a specific place can help determine a language that a person can converse in.

In addition, the picture/video analysis module 224 can identify text 112B and/or audio information 113B that is associated with the picture/video 214B on the second social network 111B. The text 112B and/or audio information 113B that is associated with the picture/video 214B can indicate where the picture/video 214B was taken. For example, if the person's name is John Smith and the picture/video 214B had an associated text 112B that states "John Smith's pictures from home." The picture/video analysis module 224 can determine that John Smith lives in Paris based on picture/video 214B with the Eiffel Tower in the background, and therefore is likely to speak French. The associated text 112B can also be embedded into picture/video 214B. Another way to determine a location of where picture/video 214B is taken can be by Global Positioning Satellite (GPS). A camera/video camera can embed GPS coordinates into picture/video 214B or can output the coordinates for use by the person. The picture/video analysis module 224 can, in conjunction with the language analysis module 122, read the text 112B to help determine where picture/video 214B was taken. Based on the location, the language analysis module 122 can potentially determine a language spoken by the person.

Likewise, audio information can be associated with a picture/video 214A. For example, the audio track of a home movie could indicate where the home movie was taken, thus allowing the picture/video analysis module 224 to identify the location and possible second language.

The communication responder 225 responds to the issue of the person on the first social network 111A, based on the determination that the person can converse in the second language. This can be done automatically, based on input by the agent 140, based on text generated by the communication responder 225 and text entered by the agent 140, based on automatically created audio files (i.e., conversations of the agent with previous customers), based on a recording by the agent 140, based on text 112 and images, and the like. The communication responder 225 can respond to the issue by identifying an agent 140 in the contact center 120 that can respond to the issue based on his/her ability to speak the second language. The communication router 123 can route the communication to the identified agent 140.

For example, assume that Jane logs on to Company XYZ's blog (111) site using her Personal Digital Assistant 101B and posts a text 112 message in English stating that "my X6000 telephone keeps resetting every 2 hours." The social network monitor 121 for Company XYZ has been configured to search Company XYZ's blog site (111). The language analysis module 122 determines that Jane can communicate in English based on her post on Company XYZ's blog site (111).

Jane now sends a text communication in Spanish to the contact center 120. The communication responder 225 responds to the text communication in English based on the identification of the issue and the determination that Jane can also converse in English. This could be done automatically based on the identified issue that the X6000 telephone keeps resetting. An alternative way would be for the communication router 123 to route the communication to an agent 140 who can write in both English and Spanish. The agent 140 can then respond to the text communication in English by typing a response on the agent terminal 130. In addition to English, the response could be in both English and Spanish since the agent 140 can converse in both.

Figure 3:
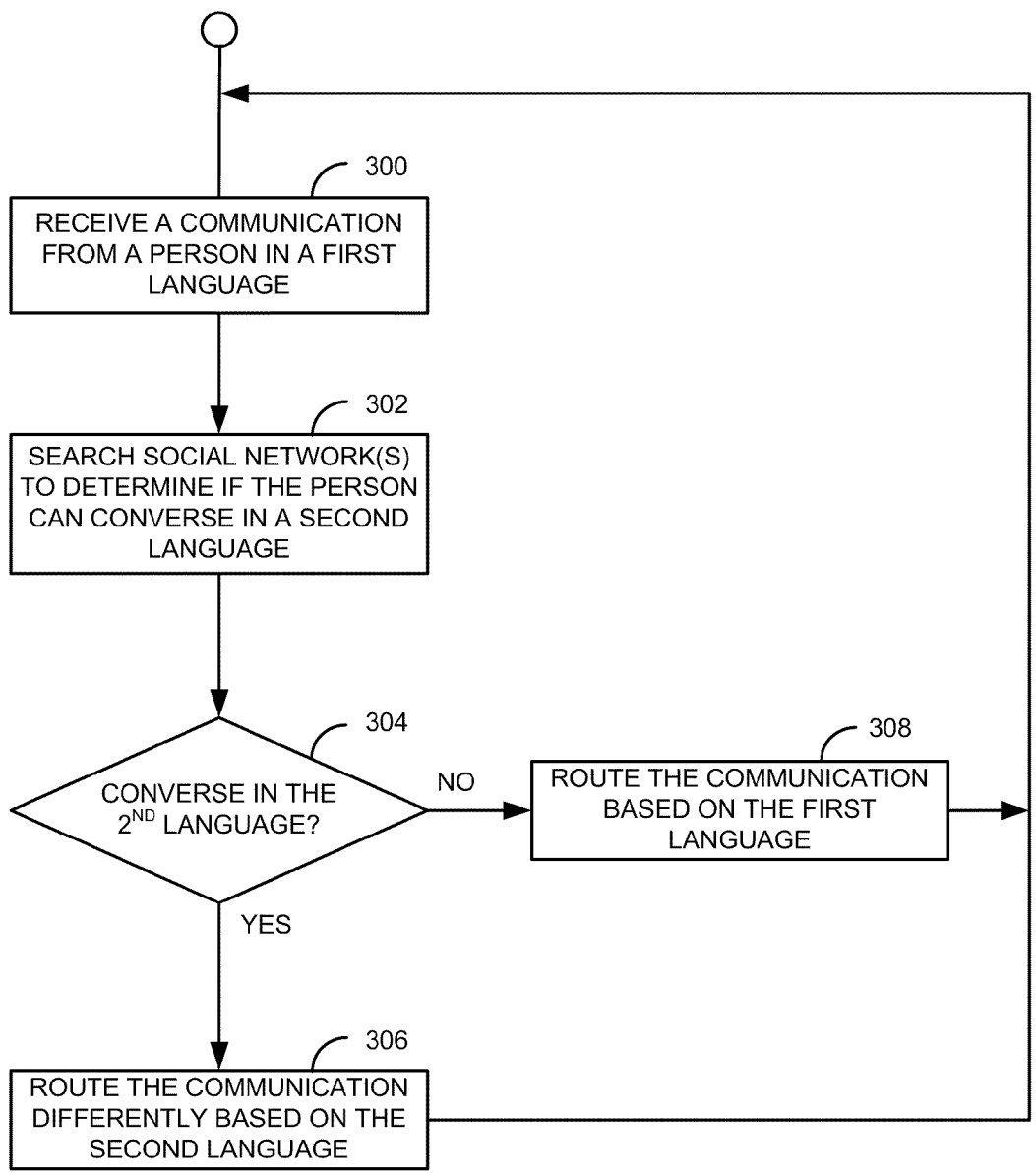
FIG. 3 is a flow diagram of a method for determining communication languages of a person contacting a contact center.

FIG. 3 is a flow diagram of a method for determining communication languages of a person contacting a contact center 120. Illustratively, the communication devices 101, the social networks 111, the network 110, the contact center 120, the social network monitor 121, the language analysis module 122, the picture/video analysis module 224, the communication router 123, the communication responder 225, and the agent terminals 130 are stored-program-controlled entities, such as a computer or processor, which perform the method of FIGS. 3-6 by executing a program stored in a storage medium, such as a memory or disk. The methods shown in FIGS. 3-6 can be implemented in different orders to achieve the same functionality.

The process begins when communication router 123 receives 300 a communication in a first language from a person. The communication can be any type of communication such as a voice communication, a video communication, an email, an Instant Message (IM), and the like. The social network monitor 121 searches 302 the social network 111 to determine if the person can converse in a second language (i.e., in one or more second languages). Note that step 302 can come before step 300 based on a previous interaction with the person (e.g., if in step 304, the person can converse in the second language(s), the communication router 123 routes the communication differently 306 based on the second language and the process goes to step 300. If in step 304, the person cannot converse in the second language, the communication router 123 routes 308 the communication based on the first language and the process goes to step 300.

Figure 4:
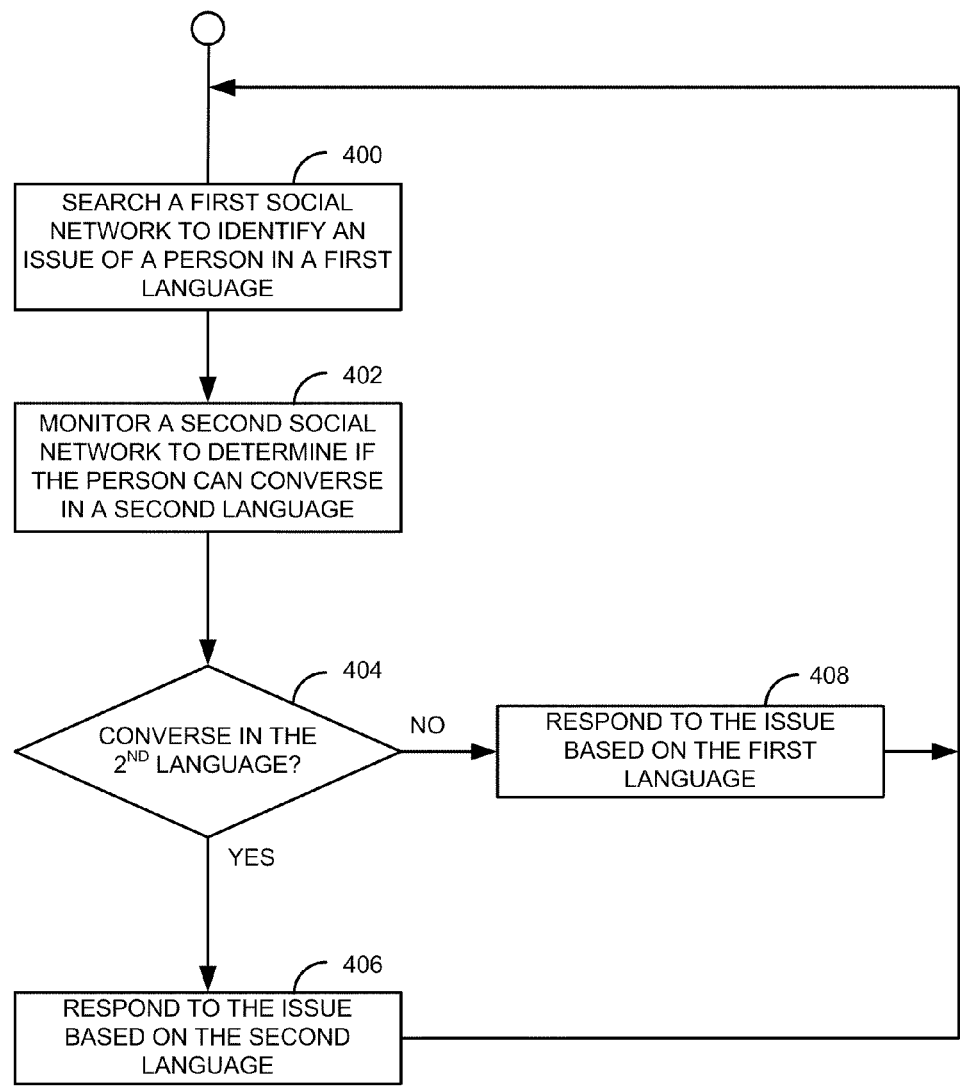
FIG. 4 is a flow diagram of a method for identifying an issue on a social network and determining communication languages of the person who identified the issue.

FIG. 4 is a flow diagram of a method for identifying an issue on a social network 111 and determining communication languages of the person who identified the issue. The process begins when the social network monitor 121 searches 400 a first social network 111A to identify an issue of a person in a first language. The social network monitor 121 searches 402 a second social network 111B to determine if the person can converse in a second language. Note that step 402 can come before step 400 based on a previous interaction with the person. If the person can converse in the second language in step 404, the communication responder 225 responds 406 to the issue based on the second language and the process goes to step 400. Otherwise, if the person cannot converse in the second language in step 404, communication responder 225 responds 408 to the issue based on the first language and the process goes to step 400.

Figure 5:
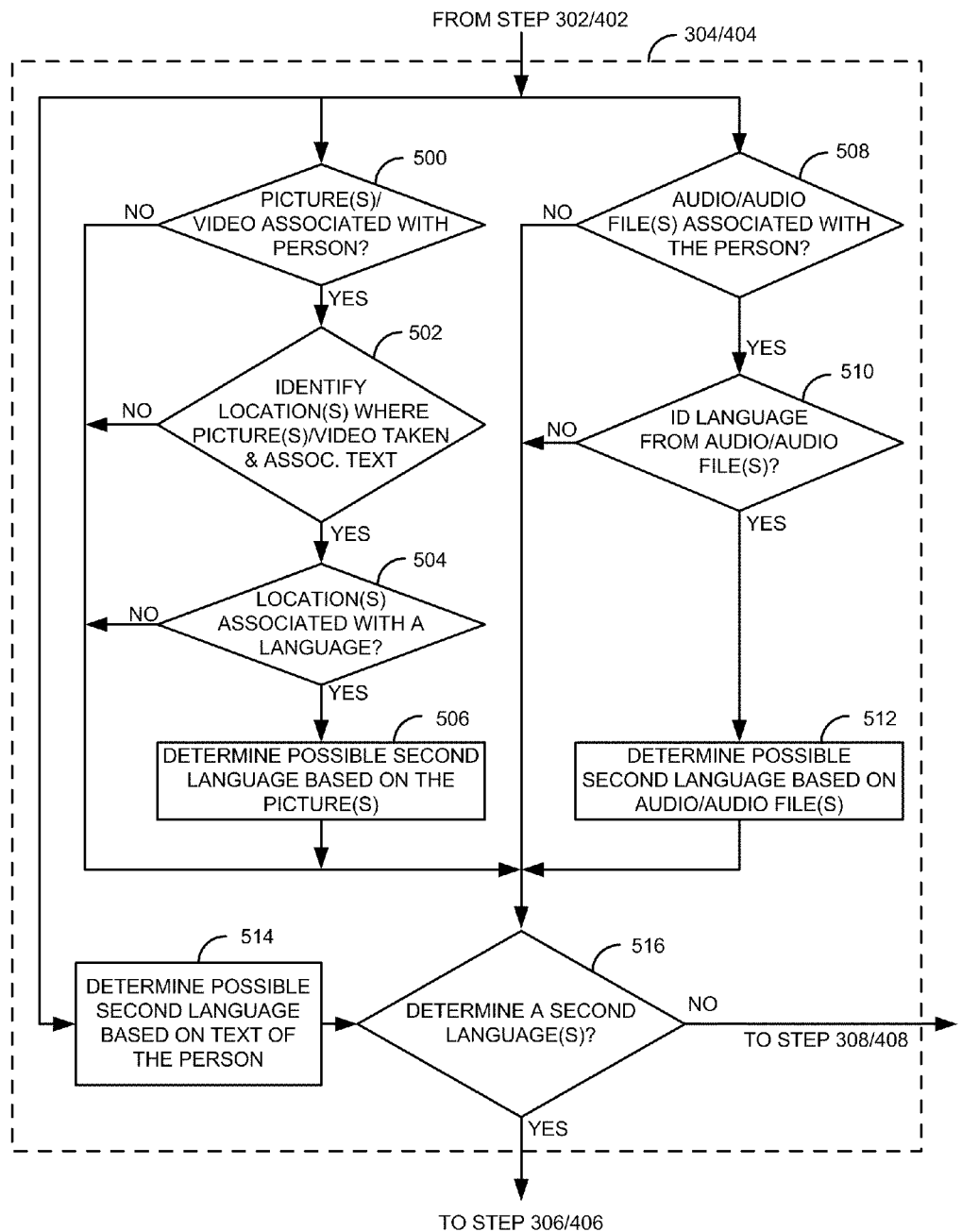
FIG. 5 is a flow diagram of a method for determining communication languages of a person.

FIG. 5 is a flow diagram of a method for determining communication languages of a person. FIG. 5 is an expanded view of step 304 and/or step 404. After completing step 302 or step 402, steps 500-506, steps 508-512, and step 514 are executed as shown in parallel. However, these steps can be performed serially as well. The steps of determining a possible second language based on pictures/video 214 (steps 500-506), the steps of determining a possible second language based on audio information 113 (steps 508-512), and the step of determining a possible second language based on text 112 (step 514) may all be implemented, may be individually implemented, or may be implemented in combination to determine the second language of a person.

In step 500, the picture/video analysis module 224 determines if there are any picture(s)/video(s) 214 associated with the person on the social network 111. The determination of associated pictures/videos 214 can be done in various ways such as identifying pictures/video 214 on a person's Facebook site that the person has identified as theirs. If there are not any pictures/video 214 associated with the person in step 500, the process goes to step 516. Otherwise, if there are pictures/videos 214 associated with the person, the picture/video analysis module 224 identifies in step 502 locations where the pictures/videos 214 were taken and any text 112 associated with the picture/video 214. Identification of locations can be accomplished by identifying objects within the picture/video 214. For example, the picture/video analysis module 224 can identify objects such as buildings, landmarks, text within the image, and the like. In addition, the picture/video analysis module 224 can identify text 112 associated with the picture/video 214. If the picture/video analysis module 224 in step 502 cannot identify locations based on objects and/or text 112 associated with the picture(s)/video(s) 214, the process goes to step 516.

Otherwise, if the picture/video analysis module 224 in step 502 can identify locations where the picture(s)/video(s) 214 were taken based on identification of objects or text 112, the picture/video analysis module 224 determines in step 504 if there is a language associated with the determined locations of where the picture(s)/video(s) 214 were taken. If the picture/video analysis module 224 cannot determine a language associated with the location (e.g., the location is determined to be in the Pacific Ocean) in step 504, the process goes to step 516. Otherwise, if an associated language can be determined for the location in step 504, the picture/video analysis module 224 determines 506 the possible second language based on the picture/video 214 and the process goes to step 516.

Determining the second language based on the picture/video 214 in step 506 can be done in different ways. For example, if the picture/video 214 was taken in New York City based on associated Global Positioning Satellite (GPS) coordinates and the associated text 112 indicated that it was the person's home, the picture/video analysis module 224 can determine the possible second language as English. On the other hand, if the associated text 112 indicated that the person was on vacation in New York City with their interpreter, the picture/video analysis module 224 can determine that the second language is likely not English.

In step 508, the language analysis module 122 identifies any audio/audio files (audio information 113) that are associated with the person on the social network 111. This can be done based on whether the person has identified that audio information 113 is the person's audio files. If the language analysis module 122 in step 508 cannot identify any audio information 113 associated with the person, the process goes to step 516. Otherwise, if the language analysis module 122 can identify associated audio information 113 in step 508, the language analysis module 122 attempts to identify in step 510 spoken language(s) in the audio information 113. If the language analysis module 122 in step 510 cannot identify any spoken languages in the audio information 113, the process goes to step 516. Otherwise, if the language analysis module 122 can identify a spoken language in step 510, the language analysis module 122 determines 512 the possible second language based on the languages spoken in the audio information 113 and the process goes to step 516.

In step 514, the language analysis module 122 determines the possible second language based on text 112 of the person. For example, the person is conversing with someone on a blog site (social network 111) in Japanese text 112. The process then goes to step 516. In step 516, a determination is made of a possible second language that the person may be able to converse in. This can be done in a variety of ways such as ranking based on text 112, audio information 113, and/or pictures/video 214. For example, if the person can converse in English text 112, but also has Japanese audio files, the social network monitor 121 may rank the English text 112 as the second language over Japanese because the person may like to listen to Japanese music, but may not be able to converse in Japanese. Based on the types of information that is received by the social network monitor 121, the social network monitor 121 can determine that the person may converse in multiple languages. If the social network monitor 121 cannot determine a second language in step 516, the process goes to steps 308/408. Otherwise, if the social network monitor 121 can determine a second language(s) in step 516, the process goes to steps 306/406.

Figure 6:
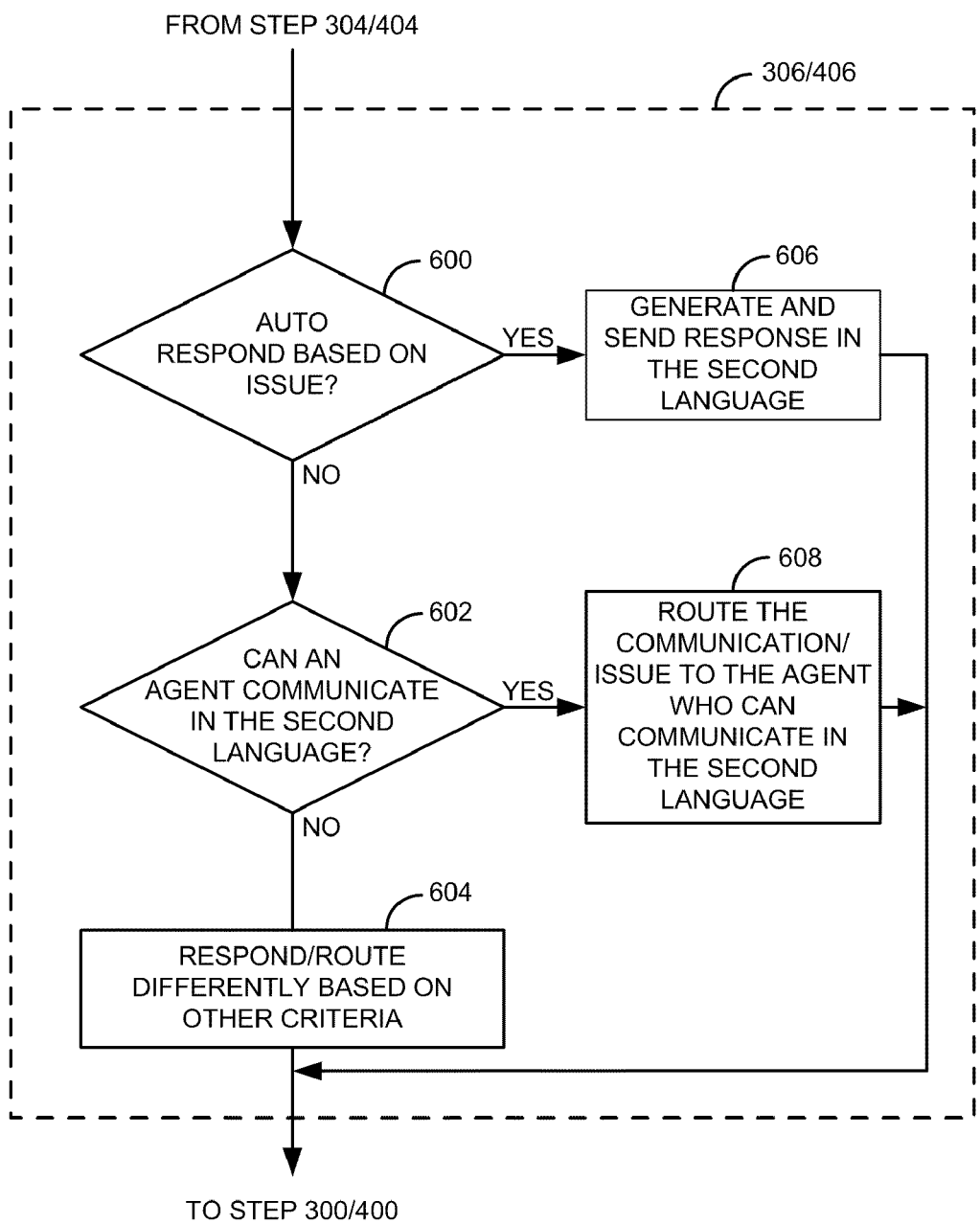
FIG. 6 is a flow diagram of a method of different ways to respond based on determining communication languages of a person.

FIG. 6 is a flow diagram of a method of different ways to respond based on determining communication languages of a person. FIG. 6 is an expanded view of steps 306/406. The process begins at step 600 after a determination is made that the person can converse in the second language (step 304/404). In step 600 the communication responder 225 determines, based on the issue, if an automatic response can be made. If the communication responder 225 can automatically respond based on the issue in step 600, the communication responder 225 generates 606 and sends the response in the second language and the process goes to step 300/400. The response can be in both the first language and the second language. The response can include text 112, picture/video 214, audio information 112, and the like.

Otherwise, if the communication responder 225 cannot send a response based on the issue in step 600, the communication router 123 identifies in step 602 an agent 140 who can communicate in the second language. If the communication router 123 can identify in step 602 an agent 140 who can communicate in the second language, the communication router 123 routes 608 the communication along with the issue to the agent 140 who can communicate in the second language and the process goes to step 300/400.

Otherwise, if the communication router 123 cannot identify an agent 140 in step 608 who can communicate in the second language, the communication router 123 and/or the communication responder 225 can respond/route 604 differently based on other criteria and the process goes to step 300/400. Other criteria can be information such as the first language, waiting times in the contact center 120, the issue, and the like.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

Of course, various changes and modifications to the illustrative embodiment described above will be apparent to those skilled in the art. These changes and modifications can be made without departing from the spirit and the scope of the system and method and without diminishing its attendant advantages. The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   a. at a communication router, receiving a communication from a person, wherein the communication is in a first language;
   b. searching from a social network monitor, a social network to determine if the person can converse in a second language on the social network; and
   c. in response to determining that the person can converse in the second language on the social network, routing the communication differently.

2. The method of claim 1, wherein routing the communication differently comprises: routing the communication to a different agent.

3. The method of claim 1, wherein routing the communication differently comprises: automatically responding to the communication in the second language.

4. The method of claim 1, wherein determining that the person can converse in the second language on the social network comprises: identifying a location of where a picture or a video was taken to determine the second language.

5. The method of claim 4, wherein identifying the location of where the picture or video was taken is determined based on at least one of the following:
   i. a Global Positioning Satellite (GPS) coordinate associated with the picture or the video,
   ii. a text associated with the picture or the video, and
   iii. an audio signal associated with the picture or the video.

6. The method of claim 1, wherein determining that the person can converse in the second language on the social network comprises: identifying a text associated with a picture or a video on the social network, wherein the text indicates a location of where the picture or the video was taken is not associated with the second language.

7. The method of claim 1, wherein determining that the person can converse in the second language on the social network comprises identifying at least one of the following: a language of an audio file, a language of a music file, a language of an audio portion of a video, and a language of an audio conversation.

8. The method of claim 1, wherein determining that the person can converse in the second language on the social network further comprises: identifying a communication on the social network between the person and a friend or a family member in the second language.

9. The method of claim 1, wherein the second language is identified based on at least one of the following: a language identifier, a text, a picture, a browser cookie, a language plug-in, a telephone number, an installed language, a web browser history, and a language character in a picture.

10. A method comprising:
    a. at a social network monitor, searching a first social network to identify an issue of a person in a first language;
    b. at the social network monitor, searching a second social network to determine if the person can converse in a second language; and
    c. in response to determining that the person can converse in the second language, responding to the issue of the person based on the second language.

11. The method of claim 10, further comprising the step of identifying an agent of a contact center to respond to the issue in the second language.

12. The method of claim 10, wherein responding to the issue of the person is done automatically in the second language.

13. The method of claim 10, wherein determining that the person can converse in the second language comprises: identifying a location of where a picture or a video was taken to determine the second language.

14. The method of claim 10, wherein determining that the person can converse in the second language comprises: identifying a text associated with a picture or a video on the second social network, wherein the text indicates that a location of where the picture or the video was taken is not associated with the second language.

15. The method of claim 14, wherein the location of where the picture or the video was taken is determined based on at least one of the following:
    i. a Global Positioning Satellite (GPS) coordinate associated with the picture or the video,
    ii. a text associated with the picture or the video, and
    iii. an audio signal associated with the picture or the video.

16. The method of claim 10, wherein determining that the person can converse in the second language on the social network further comprises: identifying a communication on the social network between the person, and a friend or a family member in the second language.

17. The method of claim 10, wherein determining that the person can converse in the second language on the social network comprises identifying at least one of the following: a language of an audio file, a language of a music file, a language of an audio portion of a video, and a language of an audio conversation.

18. The method of claim 10, wherein the second language is identified based on at least one of the following: a language identifier, a text, a picture, a browser cookie, a language plug-in, a telephone number, an installed language, a web browser history, and a language character in a picture.

19. A system comprising:
    a. a social network monitor configured to search a social network to determine if a person can converse in a second language on the social network; and
    b. a communication router configured to receive a communication from the person, wherein the communication is in a first language and responsive to determining that the person can converse in the second language on the social network, routing the communication differently.

20. The system of claim 19, wherein routing the communication differently comprises: routing the communication to a different agent.

21. The system of claim 19, wherein routing the communication differently comprises: automatically responding to the communication in the second language.

22. The system of claim 19, wherein determining that the person can converse in the second language on the social network comprises: identifying a location of where a picture or a video was taken to determine the second language.

23. The system of claim 22, wherein identifying the location of where the picture or the video was taken is determined based on at least one of the following:
   i. a Global Positioning Satellite (GPS) coordinate associated with the picture or the video,
   ii. a text associated with the picture or the video, and
   iii. an audio signal associated with the picture or the video.

24. The system of claim 19, wherein determining that the person can converse in the second language on the social network comprises: identifying a text associated with a picture or a video on the social network, wherein the text indicates that a location of where the picture or the video was taken is not associated with the second language.

25. The method of claim 19, wherein determining that the person can converse in the second language on the social network comprises identifying at least one of the following: a language of an audio file, a language of a music file, a language of an audio portion of a video, and a language of an audio conversation.

26. The system of claim 19, wherein determining that the person can converse in the second language on the social network further comprises: identifying a communication on the social network between the person and a friend or a family member in the second language.

27. The system of claim 19, wherein the second language is identified based on at least one of the following: a language identifier, a text, a picture, a browser cookie, a language plug-in, a telephone number, an installed language, a web browser history, and a language character in a picture.

28. A system comprising:
   a. a social network monitor configured to search a first social network to identify an issue of a person in a first language and search a second social network to determine if the person can converse in a second language; and
   b. a communication responder configured to respond to the issue of the person based on the second language responsive to determining that the person can converse in the second language.

29. The system of claim 28, further comprising a communication router configured to identify an agent of a contact center to respond to the issue in the second language.

30. The system of claim 28, wherein responding to the issue of the person is done automatically in the second language.

31. The system of claim 28, wherein determining that the person can converse in the second language comprises: identifying a location of where a picture or a video was taken to determine the second language.

32. The system of claim 28, wherein determining that the person can converse in the second language comprises: identifying a text associated with a picture or a video on the second social network, wherein the text indicates a location of where the picture or the video was taken is not associated with the second language.

33. The system of claim 32, wherein the location of where the picture or the video was taken is determined based on at least one of the following: i. a Global Positioning Satellite (GPS) coordinate associated with the picture or the video, ii. a text associated with the picture or the video, and iii. an audio signal associated with the picture or the video.

34. The system of claim 28, wherein determining that the person can converse in the second language on the social network further comprises: identifying a communication on the social network between the person and a friend or a family member in the second language.

35. The method of claim 28, wherein determining that the person can converse in the second language on the social network comprises identifying at least one of the following: a language of an audio file, a language of a music file, a language of the audio portion of a video, and a language of an audio conversation.

36. The method of claim 28, wherein the second language is identified based on at least one of the following: a language identifier, a text, a picture, a browser cookie, a language plug-in, a telephone number, an installed language, a web browser history, and a language character in a picture.

* * * * *